(12) United States Patent
Pandura et al.

(10) Patent No.: US 8,424,947 B2
(45) Date of Patent: Apr. 23, 2013

(54) ONE-PIECE COVERING ELEMENT

(75) Inventors: Michael Pandura, Bietigheim-Bissingen (DE); Martin Frank, Muehlacker (DE)

(73) Assignee: Dr. Ing. h.c.F. Porsche Aktiengesellschaft (DE)

( * ) Notice: Subject to any disclaimer, the term of this patent is extended or adjusted under 35 U.S.C. 154(b) by 229 days.

(21) Appl. No.: 13/011,952

(22) Filed: Jan. 24, 2011

(65) Prior Publication Data
US 2011/0181066 A1 Jul. 28, 2011

(30) Foreign Application Priority Data
Jan. 22, 2010 (DE) .......................... 10 2010 005 326

(51) Int. Cl.
*B62D 25/14* (2006.01)
(52) U.S. Cl.
USPC ........................................................... 296/70
(58) Field of Classification Search .............. 296/70, 296/208; 180/90; 181/224; 280/752
See application file for complete search history.

(56) References Cited

U.S. PATENT DOCUMENTS

| | | | | |
|---|---|---|---|---|
| 5,564,515 A * | 10/1996 | Schambre | ...................... | 180/90 |
| 5,676,216 A * | 10/1997 | Palma et al. | ................... | 180/90 |
| 5,857,726 A * | 1/1999 | Yokoyama et al. | ............. | 296/70 |
| 6,095,272 A * | 8/2000 | Takiguchi et al. | .............. | 180/90 |
| 6,273,495 B1 * | 8/2001 | Haba et al. | ............... | 296/193.02 |
| 6,371,551 B1 * | 4/2002 | Hedderly | ....................... | 296/192 |
| 6,464,280 B1 * | 10/2002 | Shibata et al. | .................. | 296/70 |
| 6,482,082 B1 * | 11/2002 | Derleth et al. | ................ | 454/156 |
| 6,488,330 B2 * | 12/2002 | Hedderly | ...................... | 296/192 |
| 6,705,671 B1 * | 3/2004 | Glovatsky et al. | ....... | 296/193.02 |
| 7,264,294 B2 | 9/2007 | Gresham et al. | | |
| 7,360,747 B2 * | 4/2008 | Stephan et al. | ............ | 248/311.2 |
| 7,370,500 B2 * | 5/2008 | Kapteyn | .......................... | 70/237 |
| 7,543,871 B2 * | 6/2009 | Quigley et al. | ............ | 296/24.34 |
| 7,650,230 B1 * | 1/2010 | Laverick et al. | .............. | 701/491 |
| 7,784,846 B2 * | 8/2010 | Vasko et al. | ................... | 296/39.1 |
| 7,900,988 B2 * | 3/2011 | Ryu | ........................... | 296/37.12 |
| 2004/0031279 A1 * | 2/2004 | Kamiya et al. | .................. | 62/244 |
| 2005/0248175 A1 | 11/2005 | Stack | | |
| 2005/0253409 A1 * | 11/2005 | Sato et al. | ........................ | 296/70 |
| 2010/0026034 A1 * | 2/2010 | Storgato et al. | ................. | 296/70 |

FOREIGN PATENT DOCUMENTS

| | | |
|---|---|---|
| DE | 297 06 506 | 7/1997 |
| DE | 202 05 512 | 9/2002 |
| DE | 10 2006 008 039 | 8/2008 |

* cited by examiner

*Primary Examiner* — Kiran B Patel
(74) *Attorney, Agent, or Firm* — Gerald E. Hespos; Michael J. Porco; Matthew T. Hespos

(57) ABSTRACT

A covering element for covering an air duct on a dashboard in a motor vehicle is of one-piece design and has two lateral air outflow areas and a loudspeaker area arranged therebetween. Each lateral air outflow area is subdivided into a central area that can be connected to communicate with the air duct, and at least one further air outlet area, via which waste heat from electronic assemblies can be discharged.

9 Claims, 4 Drawing Sheets

ONE-PIECE COVERING ELEMENT

CROSS REFERENCE TO RELATED APPLICATION

This application claims priority under 35 USC 119 to German Patent Application No. 10 2010 005 326.0, filed on Jan. 22, 2010, the entire disclosure of which is incorporated herein by reference.

BACKGROUND OF THE INVENTION

1. Field of the Invention

The invention relates to a one-piece covering element.

2. Description of the Related Art

US 2005/0248175 A1 discloses a covering element for covering an air duct in a motor vehicle. The covering element generally is made from plastic and is used in the area of a dashboard.

DE 10 2006 008 039 B4 discloses a covering element for a center console of a motor vehicle and is designed as a plastic injection molding part with lateral covering elements for covering the air ducts.

DE 297 06 506 U1 discloses a protective grille for an air intake opening of a heating or air-conditioning system of a motor vehicle. The protective grille is produced by injection molding and has grille bars of substantially round cross section that are intended to reduce noise generation.

DE 202 05 512 U1 discloses a cover for an air outlet opening of a ventilation system in a motor vehicle. The cover has a first section with fixed and/or movable air guide slats or air guide ribs and a second section with a large-hole honeycomb or polygonal rib structure as a support for a decorative or loudspeaker cover. This decorative or loudspeaker cover is manufactured from plastic in one piece with the first and second sections.

The invention relates to a covering element with enhanced functionality.

SUMMARY OF THE INVENTION

The invention relates to a covering element for covering an air duct in a dashboard in a motor vehicle. The covering element has at least two lateral air outflow areas and a loudspeaker area therebetween. The covering element also subdivides the lateral air outflow areas into a central area that can be connected to communicate with the air duct, and at least one further air outlet area via which waste heat from electronic assemblies, e.g. a radio, can be discharged. The covering element of the invention thus covers at least one air duct, covers the loudspeaker and simultaneously discharges heat from electronic assemblies in the motor vehicle, thereby significant enhancing functionality in comparison with previously known covering elements. The covering element of the invention preferably is of one-piece design, thereby significantly simplifying mounting on the dashboard of the motor vehicle in comparison with previous, multi-part covering elements. The reduction in the outlay on assembly is immediately apparent in a reduction of assembly costs. The combined heat discharge and air outflow areas also reduces any troublesome smell from heat-radiating electronic assemblies since the heat that they radiate is mixed and thereby homogenized with the air flowing out of the air outflow area immediately after its emergence.

The covering element preferably is designed as a two-component plastic injection molding, thereby achieve high-quality manufacture and comparatively low production costs. At the same time, the respective covering element can be adapted easily to different vehicle lines or equipment options by using different plastics, thereby making it possible to increase flexibility as regards the use of the covering element. The second component (soft component) functions to prevent noise arising between adjoining assemblies.

Each air outlet area may have two further air outlet areas next to the central air outlet area and heat from electronic assemblies can be discharged via the two further air outlet areas in each air outflow area. The loudspeaker area also may be used as an air outlet area to discharge heat from the electronic assemblies. The comparatively large area from which heat can be discharged enables continuous cooling of the electronic assemblies and thereby considerably reduces the thermal stress to which the electronic assemblies are subjected.

Further important features and advantages of the invention will become apparent from the drawings and from the associated description of the drawings.

The features mentioned above and explained below can be used in the indicated combination, in other combinations or in isolation without exceeding the scope of the invention.

Preferred illustrative embodiments of the invention are shown in the drawings and are explained in greater detail in the following description, in which the same reference signs relate to identical, similar or functionally identical assemblies.

DETAILED DESCRIPTION OF THE PREFERRED EMBODIMENTS

Figure 1:
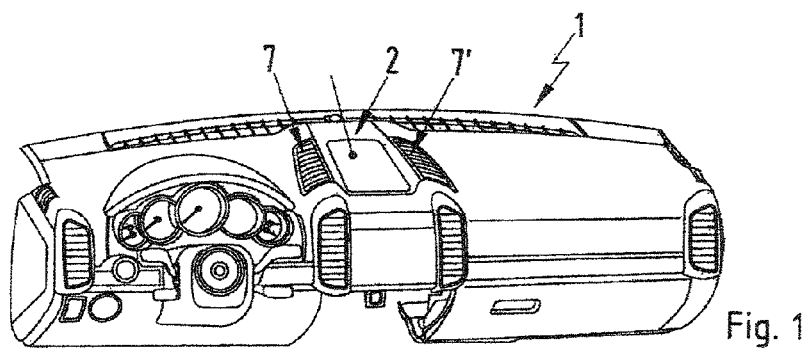
FIG. 1 shows a covering element according to the invention after installation in a dashboard of a motor vehicle.
Figure 2:
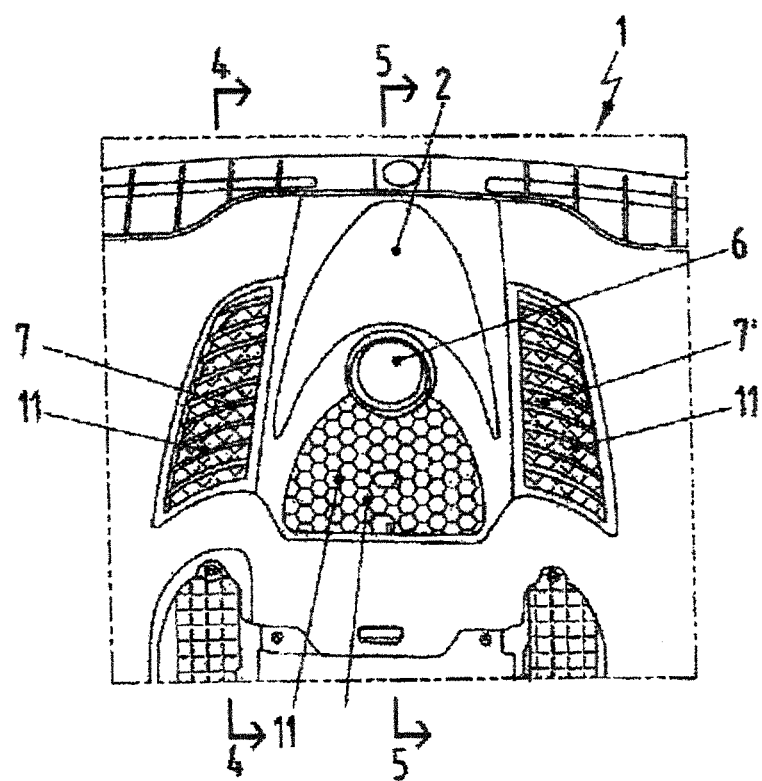
FIG. 2 is an elevational view of a dashboard with a covering element that is different from the embodiment of FIG. 1.
Figure 3:
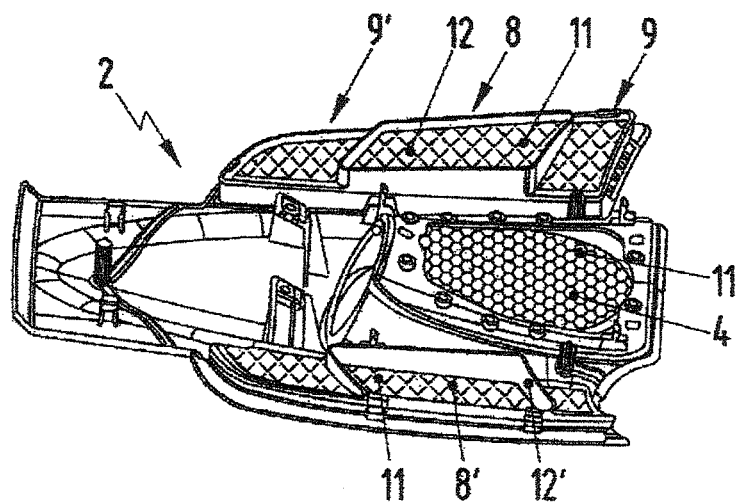
FIG. 3 shows a rear side of the covering element of the dashboard shown in FIG. 2.
Figure 5:
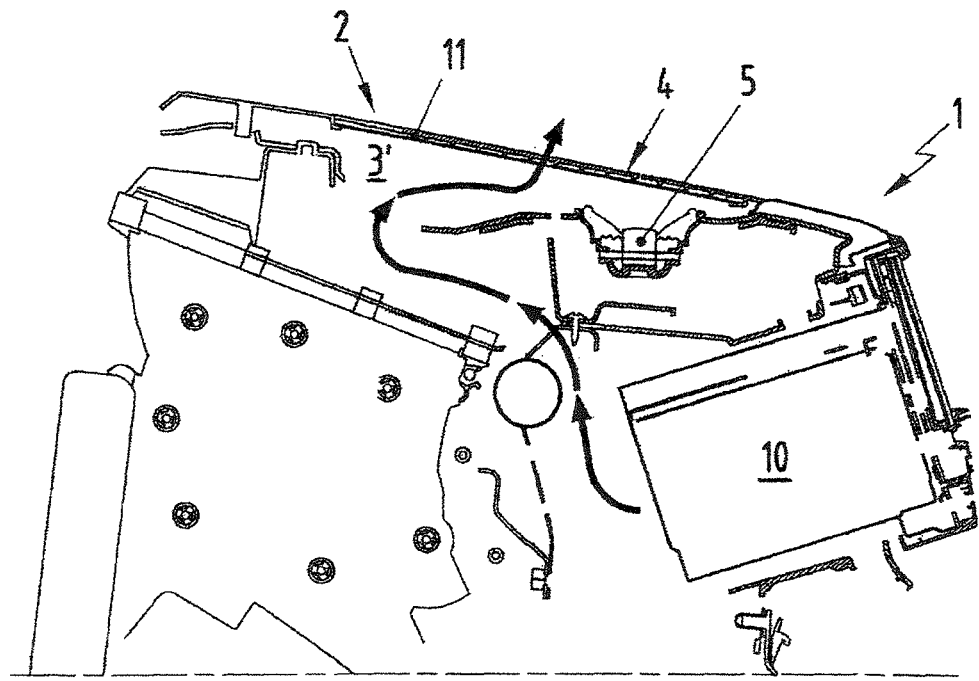
FIG. 5 is a cross-section taken along line 5-5 in FIG. 2 and showing the dashboard in a central area of the covering element.

A dashboard 1 of a motor vehicle is identified by the numeral 1 in FIG. 1. A central area of the dashboard 1 has a covering element 2 according to the invention. The covering element 2 covers one or more air ducts 3, 3' and a loudspeaker 5, as shown in FIG. 5. FIG. 2 shows a slightly different covering element 2 with a recess 6, which, for example, can receive a compass. The covering element 2 is of one-piece design and comprises at least two lateral air outflow areas 7 and 7' and a loudspeaker area 4 arranged therebetween. The lateral air outflow areas 7 and 7' each are subdivided into a central area 8 that can be connected to communicate with the air duct 3, and at least one further air outlet area, in the present case two further air outlet areas 9 and 9', for discharging waste heat from electronic assemblies 10, e.g. a navigation system or a radio.

All of the areas 4, 7, 8 and 9 of the covering element 2 are covered by a grille 11 that functions as a screen. The grille 11 also prevents coins, for example, from being thrown unintentionally into the air ducts 3, 3', which would be possible without the grilles 11 and which can lead to unpleasant noise in the long term. The grilles 11 and the covering element 2 can be of one-piece design or can be welded, adhesively bonded or firmly connected in some other way. The covering element 2 is designed as a plastic injection molding, in particular as a two-component plastic injection molding, thereby allowing manufacture that is both economical and of high quality. The grille 11 is configured appropriately to prevent insertion in the area therebelow, and this has a positive visual effect.

Figure 4:
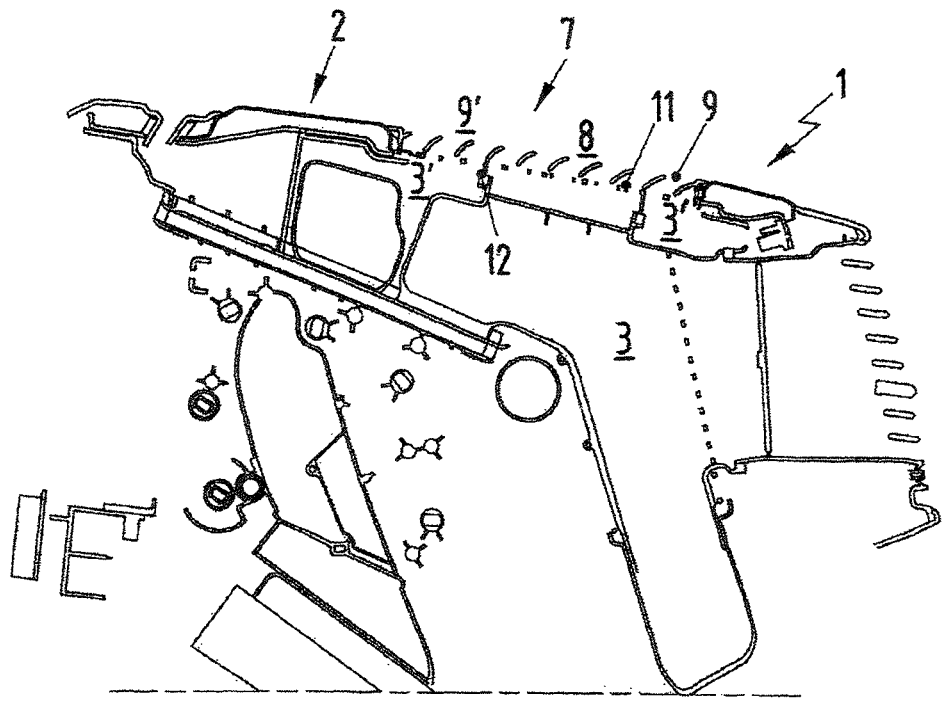
FIG. 4 is a cross-section taken along line 4-4 in FIG. 2 and showing the dashboard in the area of the lateral air outflow areas.

As shown in FIG. 4, two further air outlet areas 9 and 9' are provided in each air outflow area 7, 7' and are disposed next to the central area 8 of the respective lateral air outflow area 7, 7'. The further air outlet areas 9 and 9' are connected to communicate with the air duct 3' and function to discharge heat from the electronic assemblies 10.

To reduce noise, the lateral air outflow areas 7, 7' each have a border section that is of lower rigidity and softer than the remainder of the air outflow area 7, 7', thereby ensuring decoupling of vibration.

A connection stub 12, 12' is provided on a rear side of each of the two central areas 8, 8' of the covering element 2 to simplify mounting of the covering element 2 on the dashboard 1 and connection to the air duct 3. The loudspeaker area 4 can be air-permeable and can be connected to communicate with the air duct 3' to cool the electronic assembly components. Heat also can be discharged via the loudspeaker area 4.

The one-piece design of the covering element 2 simplifies assembly during manufacture of the dashboard 1 since the covering element 2 can be inserted in one piece into a corresponding opening in the dashboard 1. Sealing contours, such as sealing lips can be formed on the covering element 2, such as on the connection stub 12, 12', thereby permitting an easy and leak tight connection to the air duct 3. At the same time, the air duct 3 can be connected directly to a heating/air-conditioning unit of the motor vehicle.

What is claimed is:

1. A covering element (2) for covering an air duct (3) on a dashboard (1) in a motor vehicle, the covering element (2) being of one-piece design and comprising two lateral air outflow areas (7,7') and a loudspeaker area (4) arranged between the lateral air outflow areas (7, 7'), each of the lateral air outflow areas (7,7') being subdivided into a central area (8, 8') configured to be connected to communicate with the air duct (3), and at least one further air outlet area (9, 9') disposed to discharge waste heat from electronic assemblies (10).

2. The covering element (2) of claim 1, wherein at least one of the areas (4, 7, 7', 8, 8', 9, 9') of the covering element (2) is covered by a grille (11).

3. The covering element (2) of claim 2, wherein the grille (11) and the covering element (2) are integral to one another.

4. The covering element (2) of claim 3, wherein the grille (11) and the covering element (2) are unitary with one another.

5. The covering element of claim 3, wherein the grille (11) and the covering element (2) are welded, adhesively bonded or clipped to each other.

6. The covering element (2) of claim 1, wherein the covering element (2) is designed as a two-component plastic injection molding.

7. The covering element (2) of claim 1, wherein each air outflow area (7, 7') has two further air outlet areas (9, 9') next to the central area (8, 8').

8. The covering element (2) of claim 1, wherein the lateral air outflow areas (7, 7') have a border section of lower rigidity for reducing noise.

9. The covering element (2) of claim 1, wherein a connection stub (12, 12') is formed on a rear side of each of the two central areas (8, 8') of the lateral air outflow areas (7, 7') to allow connection to the air duct (3).

* * * * *